(12) United States Patent  (10) Patent No.: US 8,768,730 B1
Hebron et al.  (45) Date of Patent: Jul. 1, 2014

(54) METHODS AND SYSTEMS FOR PROVIDING AND UNDERWRITING LIFE INSURANCE BENEFITS CONVERTIBLE INTO OTHER BENEFITS

(75) Inventors: Robert J. Hebron, Maplewood, NJ (US); Craig L. DeSanto, Merrick, NY (US); Nicholas E. Pasyanos, Melville, NY (US)

(73) Assignee: New York Life Insurance Company, New York, NY (US)

( * ) Notice: Subject to any disclaimer, the term of this patent is extended or adjusted under 35 U.S.C. 154(b) by 1700 days.

(21) Appl. No.: 11/350,681

(22) Filed: Feb. 8, 2006

(51) Int. Cl.
*G06Q 40/08* (2012.01)

(52) U.S. Cl.
USPC .............................................. 705/4

(58) Field of Classification Search
CPC .... G06Q 40/08; G06Q 10/1057; G06Q 50/22
USPC ...................................... 705/35, 4
See application file for complete search history.

(56) References Cited

U.S. PATENT DOCUMENTS

| | | |
|---|---|---|
| 3,634,669 A | 1/1972 | Soumas et al. |
| 4,566,066 A | 1/1986 | Towers |
| 4,722,055 A | 1/1988 | Roberts |
| 4,750,121 A * | 6/1988 | Halley et al. ................ 705/35 |
| 4,989,141 A | 1/1991 | Lyons et al. |
| 5,132,899 A | 7/1992 | Fox |
| 5,185,696 A | 2/1993 | Yoshino et al. |
| 5,231,571 A | 7/1993 | D'Agostino |
| 5,479,344 A | 12/1995 | Keziah, Jr. |
| 5,502,637 A | 3/1996 | Beaulieu et al. |
| 5,523,942 A | 6/1996 | Tyler et al. |
| 5,590,037 A | 12/1996 | Ryan et al. |
| 5,689,649 A | 11/1997 | Altman et al. |
| 5,712,984 A | 1/1998 | Hammond et al. |
| 5,752,236 A | 5/1998 | Sexton et al. |
| 5,754,980 A | 5/1998 | Anderson et al. |
| 5,761,645 A | 6/1998 | Hawkins |
| 5,784,696 A | 7/1998 | Melnikoff |
| 5,799,287 A | 8/1998 | Dembo |

(Continued)

FOREIGN PATENT DOCUMENTS

| | | |
|---|---|---|
| JP | 10228509 A | 8/1998 |
| WO | WO 01/50306 | 7/2001 |

(Continued)

OTHER PUBLICATIONS

ETF Group Life Insurance, Wisconsin Public Employers Group Life Insurance Program, Oct. 28, 2004.*

(Continued)

*Primary Examiner* — Lindsay M Maguire
*Assistant Examiner* — Hao Fu
(74) *Attorney, Agent, or Firm* — Meister Seelig & Fein LLP

(57) ABSTRACT

Method and system for providing a insurance policy with convertible benefits. The method includes receiving information to determine a first type of benefit which will be provided under a first type of insurance, a second type of benefit to be provided under a second type of insurance policy, and a conversion event. The method further includes computing a premium for an insurance policy which provides the first benefit before the conversion event and the second benefit after the occurrence of the conversion event, and the issuance of an insurance policy based on the computed premium.

25 Claims, 6 Drawing Sheets

(56) References Cited

U.S. PATENT DOCUMENTS

| | | | |
|---|---|---|---|
| 5,806,047 | A | 9/1998 | Hackel et al. |
| 5,812,987 | A | 9/1998 | Luskin et al. |
| 5,819,230 | A | 10/1998 | Christie et al. |
| 5,864,828 | A | 1/1999 | Atkins |
| 5,893,071 | A | 4/1999 | Cooperstein |
| 5,918,217 | A | 6/1999 | Maggioncalda et al. |
| 5,933,815 | A | 8/1999 | Golden |
| 5,956,691 | A | 9/1999 | Powers |
| 5,978,778 | A | 11/1999 | O'Shaughnessy |
| 5,991,733 | A | 11/1999 | Aleia et al. |
| 5,991,740 | A | 11/1999 | Messer |
| 5,999,929 | A | 12/1999 | Goodman |
| 6,012,044 | A | 1/2000 | Maggioncalda et al. |
| 6,014,632 | A | 1/2000 | Gamble et al. |
| 6,021,397 | A | 2/2000 | Jones et al. |
| 6,026,364 | A | 2/2000 | Whitworth |
| 6,055,517 | A | 4/2000 | Friend et al. |
| 6,064,969 | A | 5/2000 | Haskins |
| 7,685,007 | B1 * | 3/2010 | Jacobson ................ 705/4 |
| 2002/0169715 | A1 | 11/2002 | Ruth et al. |
| 2003/0004844 | A1 | 1/2003 | Hueler |
| 2003/0028466 | A1 | 2/2003 | Jenson et al. |
| 2003/0126053 | A1 | 7/2003 | Boswell et al. |
| 2003/0144888 | A1 | 7/2003 | Baron et al. |
| 2006/0190304 | A1 * | 8/2006 | Kobayashi et al. ........ 705/4 |

FOREIGN PATENT DOCUMENTS

| | | |
|---|---|---|
| WO | WO 01/69504 | 9/2001 |
| WO | WO 01/75557 A2 | 10/2001 |
| WO | WO 02/13118 A1 | 2/2002 |
| WO | WO 02/15457 | 2/2002 |
| WO | WO 02/35363 A1 | 5/2002 |
| WO | WO 03/012594 A2 | 2/2003 |
| WO | WO 03/058378 A2 | 7/2003 |

OTHER PUBLICATIONS

Anonymous. "A Shopper's Guide to Long-Term Care Insurance," National Association of Insurance Commissioners, 1999, 45 pages.

Black, Kenneth Jr. and Harold D. Skipper, Jr. *Life Insurance* 12$^{th}$ Ed., Englewood Cliffs, NJ, Prentice-Hall, Inc. 1994, Chapters 4, 15, 16, 27 and 29.

Brown, Bruce. "KSH-2 Financial Calculator 1.6," *PC Week*, vol. 8, No. 31, Aug. 5, 1991, p. 78.

DeSimone, Marcella. "Early Enrollment Period Begins for Federal LTCI Program," *National Underwriter*, Apr. 1, 2002, vol. 106, No. 13, p. 40.

English, David. "Get Rich Quick," *Comput*, vol. 16, No. 98, Sep. 1994, p. 38.

Feldman, Saul. "Wealthbuilder 2.0," *Macworld*, vol. 10, No. 5, May 1993, p. 146.

Granza et al. "Financing Long-Term Care: Employee Needs and Attitudes, and the Employer's Role," International Society of Certified Employee Benefits Specials 1998 Benefits Quarterly, vol. 14, No. 4, pp. 60-72.

Iglehart, Mark. "Don't Gamble when Planning for Long-Term Care," *The National Public Accountant*, Apr. 2001, vol. 46, No. 2, p. 11, 2 pgs.

Iverson, Wesley. "From Desktop to the Web," *Financial Service Online*, Mar. 1999, p. 42+.

*Journal of Commerce*, "Life Before Death," Jun. 19, 1990, 2 pgs.

Kerry, Mark E. "Whole Life & an LTC Rider: One Solution to the Long-Term Care Dilemma," *Life Association News*, vol. 86, No. 7, Jul. 1991, pp. 71-75.

Poglianich, Antonio. "Life Care Communities: Evaluating a Promising Retirement Alternative," *Journal of the Institute of Certified Financial Planners*, vol. 9, No. 1, Spring 1988, pp. 29-34.

Pullman, Liz. "Personal Finance: CPAs Compute Pluses, Minuses of New Law Allowing Commissions," *Los Angeles Times*, Nov. 21, 1998.

Shipley, Chris. "12 Best Financial-Software Packages," *Working Woman*, vol. 18, No. 2, Feb. 1993, pp. 42-43.

TIAA-CREF Web Center. "Optional Long-Term Care Benefits," http://web.archive.org/web/20020210171521/http://www.tiaa-cref.org . . . , retrieved Apr. 7, 2005.

Ware, Robert C. "Medicare and Medicaid," *Life and Health Insurance Sales*, vol. 135, No. 11, Nov. 1992, pp. 28-30.

\* cited by examiner

METHODS AND SYSTEMS FOR PROVIDING AND UNDERWRITING LIFE INSURANCE BENEFITS CONVERTIBLE INTO OTHER BENEFITS

COPYRIGHT NOTICE

A portion of the disclosure of this patent document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

This invention relates to the field of insurance and other benefits, such as employee benefits, and more particularly to methods and systems for providing and administering a benefit that may convert into another benefit.

BACKGROUND OF THE INVENTION

One purpose of insurance is to provide economic protection against losses that may be incurred due to a random event, such as death, illness, or an accident. There are several forms of insurance, such as life insurance, health insurance, disability insurance, or long-term care insurance. Insurance may be purchased by an individual directly from an insurance company or may be provided by an employer, trade union, or any other type of organization. The latter type of insurance may be purchased by the employer from an insurance company, for example, as a corporate-owned life insurance (COLI). In COLI plans, life insurance may be extended to the individuals in the group, usually without individual underwriting and usually without requiring group members to provide evidence of insurability.

In addition to life insurance benefits, the employer may utilize COLI to recover the costs of other employee benefits through its favorable tax treatment. Such other benefits may include, for example, health benefits, childcare benefits, disability benefits, deferred compensation benefits, salary continuation benefits, or various flexible spending benefits.

Over a lifespan, an individual may require various levels of different benefits in various combinations. For example, the individual may desire to have life insurance before reaching a certain age and then would prefer to have a long-term care benefit instead. The individual may also desire to designate different beneficiaries for the life insurance and the long-term care benefit.

When a company owns COLI on one or more of its employees, the premium paid by the company for the COLI reduces the company's retained earnings; in turn, the company accounts for the life insurance benefit as an asset on its balance sheet at the benefit's cash surrender value. Upon occurrence of a certain event, for example, retirement of a key employee, the company may need a benefit that would pay a pension benefit or a long-term care benefit to the retired employee. Typically, companies account for the long-term benefit as a liability on their balance sheet at the estimated costs for the long-term care and pension benefit.

Currently, such benefits have been offered independently of one another, thereby affecting companies' balance sheets, requiring the beneficiaries to properly plan for their retirement, and causing significant transactional costs and expense in purchasing all the required benefits. There is therefore a need for an insurance policy, for example, COLI, that would be automatically convertible into another benefit upon occurrence of a specified event, such as retirement or the attainment of a specified age by the employee.

SUMMARY OF THE INVENTION

In one aspect of the present invention life insurance that is convertible into a paid-up long term care insurance benefit is provided. A premium is computed for the life insurance policy, and the life insurance benefit is converted into the long term care benefit on the occurrence of an event, such as the retirement of an employee or the employee's reaching a specified age. As such, the policy holder, such as the employer or a company need only obtain a single policy to secure either death or pension benefits for an employee.

Thus, in accordance with one aspect of the present invention, a computerized method for providing an insurance policy with convertible benefits is provided. The method includes receiving information to determine a first type of benefit which will be provided under a first type of insurance, a second type of benefit to be provided under a second type of insurance policy, and a conversion event. The method further includes computing a premium for an insurance policy which provides the first benefit before the conversion event and the second benefit after the occurrence of the conversion event, and the issuance of an insurance policy based on the computed premium.

In some embodiments, the first type of insurance will be life insurance and the second type of insurance will be something other than life insurance, such as long term care insurance. The life insurance may be COLI. In other embodiments, the first type of insurance and the second type of insurance are members selected from the group consisting of: whole life insurance, universal life insurance, term life insurance, corporate owned life insurance, corporate owned universal life insurance, property insurance, homeowner insurance, workers compensation insurance, long-term care insurance, disability insurance, health insurance, health care spending accounts, medical insurance, dental insurance, and vision insurance.

In some embodiments, the first benefit and the second benefit may be provided by the employee's employer. In other embodiments, the employer may arrange for a third party provider to provide the first benefit and the second benefit. The third party provider may be an insurance company. In a preferred embodiment, the individual is not permitted to designate different beneficiaries, that is, the designated beneficiary of the first benefit is the same as the designated beneficiary of the second benefit. The designated beneficiary of the first benefit may also be different than the designated beneficiary of the second benefit. The designated beneficiary of the first benefit may be an employer and the designated beneficiary of the second benefit may be an employee. In other embodiments, providing the insurance policy includes determining the first and second benefits and receiving at least one designated beneficiary of the first benefit and at least one designated beneficiary of the second benefit.

In some embodiments, providing the insurance policy includes specifying at least one event triggering the first benefit and at least one event triggering the second benefit. Thus, the insurance policy provides the first benefit upon the occurrence of a specified event triggering the first benefit and provides the second benefit upon the occurrence of a specified event triggering the second benefit. In other embodiments, the first benefit may be determined by receiving at least one specified acceleration event accelerating the first benefit.

In some embodiments, the first benefit will be converted into the second benefit upon the occurrence of the conversion event. The conversion event may be retirement of an employee covered by the life insurance or the employee's reaching a specified age or fulfilling a specified requirement.

In some embodiments, the premium may be computed by computing a first premium to fund the first benefit; computing a second premium to fund the second benefit; and computing the premium based at least in part on the first and second premiums. The premium may also be computed by identifying an expected date of the conversion event and computing an expected remaining value of the first benefit at the expected conversion event date. In other embodiments, the premium may be computed by allowing for the expected remaining value of the first benefit at the expected conversion date to be sufficient to cover fund the second benefit.

According to another aspect of the invention, a computerized method for underwriting an insurance policy with convertible benefits is provided. As those skilled in the art will appreciate, there are various types of underwriting, such as guaranteed issue underwriting, which require no individual evidence of insurability, such as a medical examination. In an embodiment, the method uses the guaranteed issue underwriting. The method includes receiving information to determine a first type of benefit which will be underwritten under a first type of insurance, a second type of benefit to be underwritten under a second type of insurance, and a conversion event, where the first benefit is provided before the conversion event and the second benefit is provided after the occurrence of the conversion event. The method further includes estimating the costs of the first and second benefits, computing a premium required to cover the estimated costs and to provide the benefits, receiving the computed premium, and investing the received premium for accumulation. The method further includes periodically checking for occurrence of triggering and/or conversion events. Alternatively, or in addition, the information regarding the occurrence of triggering and/or conversion event may be processed immediately upon receipt. If an event triggering the first benefit occurs, in some embodiments, the method further includes determining the actual costs of providing the first benefit and if the actual costs exceeds the accumulated premiums, subsidizing the cost of providing the first benefit. If a conversion event occurs prior to the occurrence of an event triggering the first benefit, in some embodiments, the first benefit converts into a second benefit and ceases to be available. Subsequently, upon the occurrence of an event triggering the second benefit, the method includes the actual costs of providing the second benefit and if the actual costs exceeds the accumulated premiums, subsidizing the cost of providing the second benefit.

The methods of the present invention can be implemented or underwritten on an apparatus, which apparatus may include a user interface, a database, which may include an actuarial database, a processor connected to the user interface and database, the processor effective to process information and perform computations.

Another aspect of the present invention includes a computerized method of offering an insurance policy with a convertible benefit, including obtaining information for determining a first benefit to be provided under a first type of insurance, a second benefit to be provided under a second type of insurance policy different than the first type of insurance, and at least one conversion event; illustrating, using the obtained information, an insurance policy providing for the first benefit before the occurrence of the conversion event and the second benefit after the occurrence of the conversion event; and offering the illustrated policy.

In accordance with other aspects of the present invention, a computerized method is described herein for providing a corporate owned life insurance policy with convertible benefits, including determining a first benefit to be provided under the corporate owned life insurance policy for an employee, a second benefit to be provided other than corporate owned life insurance, and at least one conversion event related to the employee; computing a premium for an insurance policy which provides the corporate owned life insurance policy before the occurrence of the conversion event and the second benefit after the occurrence of the conversion event; and issuing the corporate owned insurance policy based on the computed premium.

In some embodiments, the second benefit in this method may be an insurance type of benefit or another type of benefit, such as employee benefits. Examples of such employee benefits include pension benefits, deferred compensation, or flexible spending plans.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
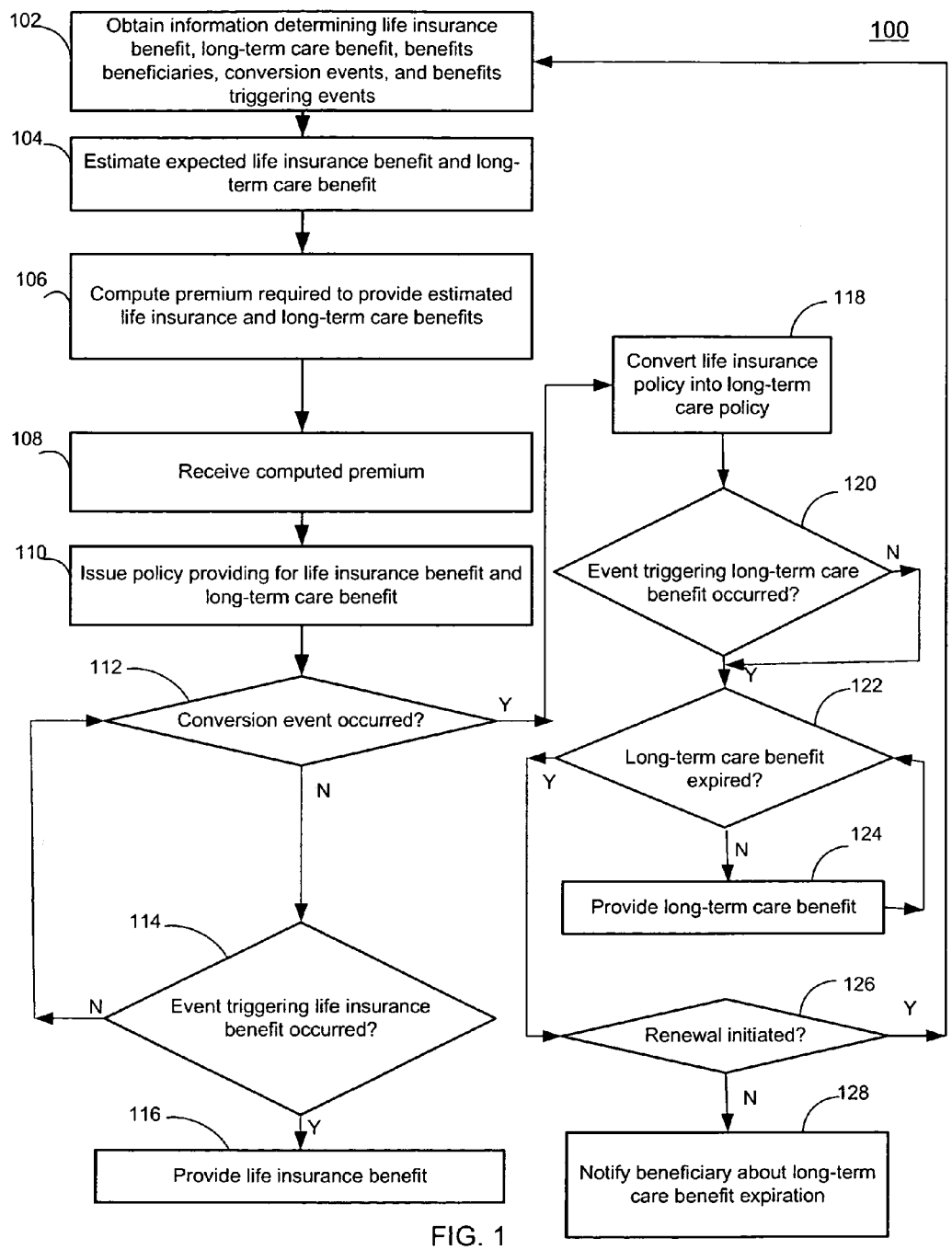
FIG. 1 is a flow chart illustrating a process of providing a life insurance benefit convertible into long-term care benefit in accordance with one embodiment of the present invention.

Referring to FIG. 1, a process 100 for providing a life insurance benefit convertible into long-term care benefit will be described. Process 100 may be used, for example, with system 400 described herein. The process described herein uses life insurance, particularly corporate owned life insurance, and long term care insurance as examples only. As described elsewhere herein, at 102, information determining a life insurance benefit, a long-term care benefit, benefits beneficiaries, conversion events, and benefit triggering events is obtained. The information determining the life insurance and long-term care benefits may include, for example, a desired level of benefits with respect to each benefit. For example, an individual may select a certain face amount of life insurance, a certain daily allowance for long-term care insurance and the duration of long-term care insurance payments. Similarly, a company may select what level of life insurance and long-term care benefits it desires to provide to its employees. The information obtained at 102 may also include selection of various policy riders and options.

The information for determining the life insurance and the long-term care benefits may further include, for example, the age, gender, health condition and health history of the insured, smoker or non-smoker status, and any other factors suitable in determining the benefits and the insurability of the insured with respect to the desired level of benefits. In case the benefits are to be provided by the employer, the information obtained at 102 may also include whether the insured employee is "actively at work," whether he or she is a key employee and any other employment related information suitable in determining the insurability of the insured with respect to the desired level of benefits.

The information obtained at 102 also includes at least one conversion event. The effect of the occurrence of a conversion event is discussed in detail below. For example, such a conversion event may occur when the insured reaches a certain age, for example, the retirement age. Alternatively, the departure of the insured employee from the company, whether voluntary or involuntary, may be designated as such a conversion event. Such conversion events may for example include promotion and transfer of the insured employee.

The information obtained at 102 may also include at least one event that triggers providing the life insurance benefit. The life insurance benefit may be triggered, for example, by the accidental death or dismemberment of the insured.

The information obtained at 102 may also include at least one event that triggers providing the long-term care benefit. The long-term care benefit may be triggered, for example, by a long-term hospitalization or any kind of disability of the insured. Alternatively, the conversion to a long-term care benefit may be triggered by the insured reaching a certain age, fulfilling a specified length of service, or retirement.

The information obtained at 102 also includes at least one beneficiary for each benefit. For example, the beneficiary of the life insurance benefit may be the employer or any other person or legal entity. Similarly, the long-term care benefit may be provided either to the insured or any other person designated by the insured. Beneficiary designation may be irrevocable or revocable. In addition, the selection of the beneficiary may be limited by the requirement that an insurable interest existed between the beneficiary and the insured. If an individual other than the principal insured is designated as a beneficiary of the long-term care benefit, the information obtained at 102 may also include any factors determining the benefits with respect to the beneficiary. These factors may include, for example, the age, gender, health condition and health history of the beneficiary, her smoker or non-smoker status, and any other factors suitable in determining the cost of providing the long-term benefit to the designated beneficiary.

All or any portion of the foregoing information may be collected manually during an interview or by using a questionnaire or automatically by accessing any number of suitable commercial and proprietary databases. For example, if the insured is an employee, the employer or a third-party benefit provider with which the employer contracted to provide the benefits, may utilize the human resources' databases, which may contain at least a portion of the required information.

At 104, the benefit provider, for example, an insurance company, estimates expected life insurance benefit and long-term care benefit. Such estimation may include, for example, estimating the cost of providing the desired level of benefits or calculating the present value of the benefits. In estimating the expected life insurance and long-term care benefits, the benefit provider may also use any suitable actuarial data, for example, any suitable mortality or morbidity tables, and any suitable statistical data relating to longevity of long-term care beneficiaries. Alternatively, or in addition, the benefit provider may utilize any suitable statistical or Monte Carlo analyses to estimate future investment returns, interest rates, the costs of nursing home or other long-term care.

At 106, the benefit provider computes a premium required to provide the estimated benefits. In some embodiments, the premium is computed to account for the cost of funding the life insurance benefit and to provide for an accumulation of value in the life insurance benefit, assuming it is not triggered before conversion, to fund the long term care benefit as of the date of the conversion. As described in detail below, by purchasing a convertible benefit, the corporate owner may offset the cost of the long-term care benefit with the premium accumulation. The computation assumes an expected date of the conversion event and computes an expected remaining value of the life insurance benefit at that expected conversion date.

An exemplary formula suitable for computing the premium is as follows:

$$v_s = (1+i)^{-(s/12)}$$

$$q'_x = \frac{1-(1-q_x)^{1/12}}{(1-q_x)^{1/12}}$$

$$p'_x = 1 - q'_x$$

$$_n p'_x = \prod_{s=0}^{n-1} p'_{x+\frac{s}{12}}$$

$$a'_{x:n} = 1 + \sum_{s=1}^{n-1} (v_s) \times (_s p'_x)$$

$$A_x = \sum_{s=0}^{\infty} (v_s) \times (_s p_x) \times \left(q'_{x+\frac{s+1}{12}}\right)$$

$$\text{Premium}_s = \frac{A_x}{a'_{x:84}}, \text{ for } s = 1 \text{ to } 84 \text{ (Premium}_s = 0 \text{ for } s > 84)$$

LTCbenefit=$b$ %×Face Amount of Life Insurance Benefit;

$$DailyLTCBenefitPayment = \frac{1}{365 \times Y} \times LTCbenefit$$

where,
Issue Date=date when initial premium is received;
x=issue age of employee;
n=number of complete months since Issue Date;
Premium=premium paid into the contract at time s, for s equal to 1 to 84;
i=annual guaranteed crediting rate;
$v_s$=present value of a dollar paid in month s based on a discount rate of i;

$q_x$=annual mortality rate for a person age x, which may be the guaranteed cost of insurance;
$p'_x$=monthly survival rate for a person age x;
$_np'_x$=probability that a person age x survives n months;
Y=number of years LTC benefit is paid out;
b %=a percentage of face value of life insurance benefit to be applied to LTC, in some embodiments, b % is in a range of about 1% to 200% In some embodiments, b % will depend on the expected or actual cost of providing the LTC benefit and will be determined based at least in part on a desired internal rate of return or profitability for the benefit provider. Modification of the b % in some embodiments will result in a lower or higher premium being charged. The foregoing formula can be used for either calculating the required premium given the face value of the life insurance benefit or alternatively calculating the desired level of LTC benefits and then determining the face value of life insurance benefit and the corresponding premium.

In case the benefit provider intends to invest the computed premiums, the provider may additionally use any suitable market performance data to account for investment gains and/or losses. The provider may also achieve losses or gains in individual instances in which the conversion event occurs before or after the expected conversion date. As one skilled in the art will recognize, and as accounted for the provider can mitigate the risks of such events across a large enough base of policy holders.

At 108, the provider receives at least a portion of the computed premium. The premium may be paid periodically (weekly, bi-weekly, monthly, annually) or as a lump sum payment. The premium payments may be deducted from pre-tax earnings of the insured or paid by the company from its pre-tax earnings to the extent allowable under tax law.

At 110, the provider issues a policy that provides for the paid for life insurance and long-term care benefits. For example, the policy may be issued as a paper policy or may be a paperless computer record in a benefit provider's database.

At 112, the benefit provider checks whether a conversion event specified at 102 has occurred. If a conversion event has occurred at 112, the life insurance benefit converts into the long-term care benefit at 118. Upon the conversion, the life insurance benefit ceases to be available and the long-term care benefit becomes available. In some embodiments, the life insurance benefit may be owned by an employer, for example, a corporation, which accounts for such a benefit as an asset on its balance sheet at its cash surrender value. The premiums paid by the corporate buyer for the life insurance benefit may affect the retained earnings. To avoid such a negative impact on the balance sheet, the cash surrender value of the life insurance asset must be at least equal to the cumulative premiums paid for the life insurance benefit. In case of a life insurance benefit that converts into a long-term care benefit, the corporate owner may account for the long-term benefit as a liability on its balance sheet at the long-term care benefit estimated costs. The accumulation of premiums, including additional cash value buildup due to investment gains on the paid premiums, and corresponding increase in cash surrender value of the life insurance asset may offset the long-term care benefit liability on the balance sheet. In other embodiments, the corporate owner may transfer the entire long-term care benefit liability off its balance sheet to the benefit provider, which assumes all the costs of providing the long-term care benefit, in case a conversion event occurs. After the conversion at 112, the life insurance benefit is no longer available and its corporate owner needs to write it off to zero on its balance sheet. The negative impact on the balance sheet is avoided, however, because, in some embodiments, the policy issued at 110 stipulates that the benefit provider pays back to the corporate owner the cash surrender value of the life insurance benefit, which will be at least equal to the cumulative premiums paid for the life insurance benefit. In some embodiments, the benefit provider will cover the cost of providing the long-term care benefit by the investment gains on the paid premiums or cash value buildups. As a result, the benefit provider bears the risk that the actual costs of providing the long-term benefits may exceed the actual investment gains on the accumulated premiums. The provider will estimate the expected investment gains and/or costs using any suitable historical data and/or statistical methods. In other embodiments, the provider may hedge the investment return risk using any suitable financial instruments and methods. In other embodiments, the corporate owner of the COLI may use the received accumulated premiums, including the cash value buildup, to fund the long-term liability.

If none of the conversion events has occurred at 112, the benefit provider checks whether an event triggering the life insurance benefit has occurred at 114. If an event triggering the life insurance benefit occurs at 114, the benefit provider provides at 116 the life insurance benefit to the designated beneficiary of the life-insurance benefit specified at 102. The life insurance benefit may be provided in various ways and combination thereof. For example, the life insurance benefit may be paid as a lump sum payment or a series of periodic payments. Selection regarding the form and manner of payments may be made at 102 or at the time the payment is due.

If a conversion event has occurred at 112, the life insurance benefit is converted into the long term care benefit, 118. The benefit provider checks whether any event triggering the long-term care benefit has occurred at 120. At 122, the benefit provider checks whether the long-term care benefit has expired. The long-term care benefit may, for example, expire after certain period of time or after certain level of the benefit specified at 102 has been provided to the insured or the designated beneficiary.

If an event triggering the long-term care benefit has occurred at 120 and the long-term care benefit has not yet expired, the benefit provider provides the long-term care benefit at 126 to the designated beneficiary of the long-term benefit specified at 102. The long-term care benefit may be provided in various ways and combination thereof. For example, the long-term care benefit may be paid directly to the designated beneficiary as a lump sum payment or a series of periodic payments. Alternatively, the benefit may be provided as a non-monetary benefit, for example, a stay at the nursing home for a certain period of time. Selection regarding the form and manner of providing the long-term care benefit may be made at 102 or at the time the benefit is due.

If the long-term care benefit has expired or is about to expire, it may be renewed at 126, if such option was selected at 102 or is otherwise available. If such renewal is initiated, the benefit provider begins process 100 anew at 102. If no renewal is initiated, the benefit provider may notify the insured or the designated beneficiary about the expiration of the long-term care benefit at 128.

Figure 2:
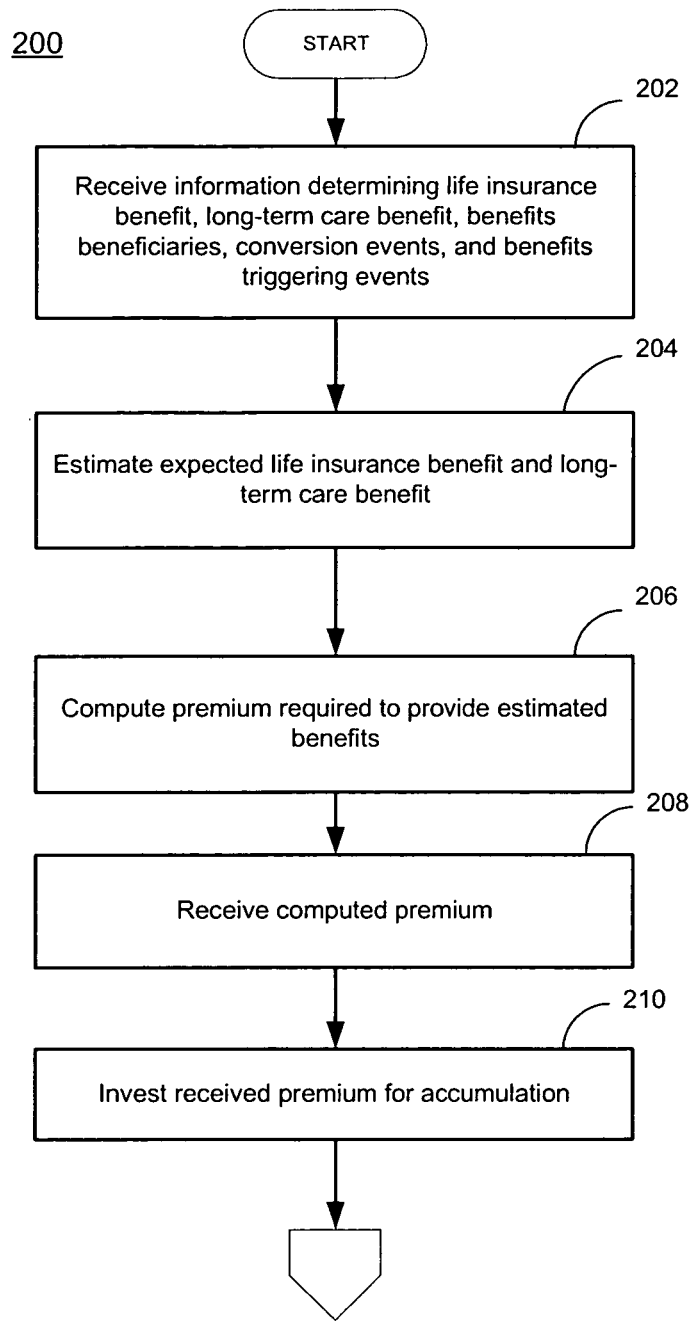
FIGS. 2-3 is a flow chart illustrating a process of underwriting a life insurance benefit convertible into long-term care benefit in accordance with one embodiment of the present invention.
Figure 3:
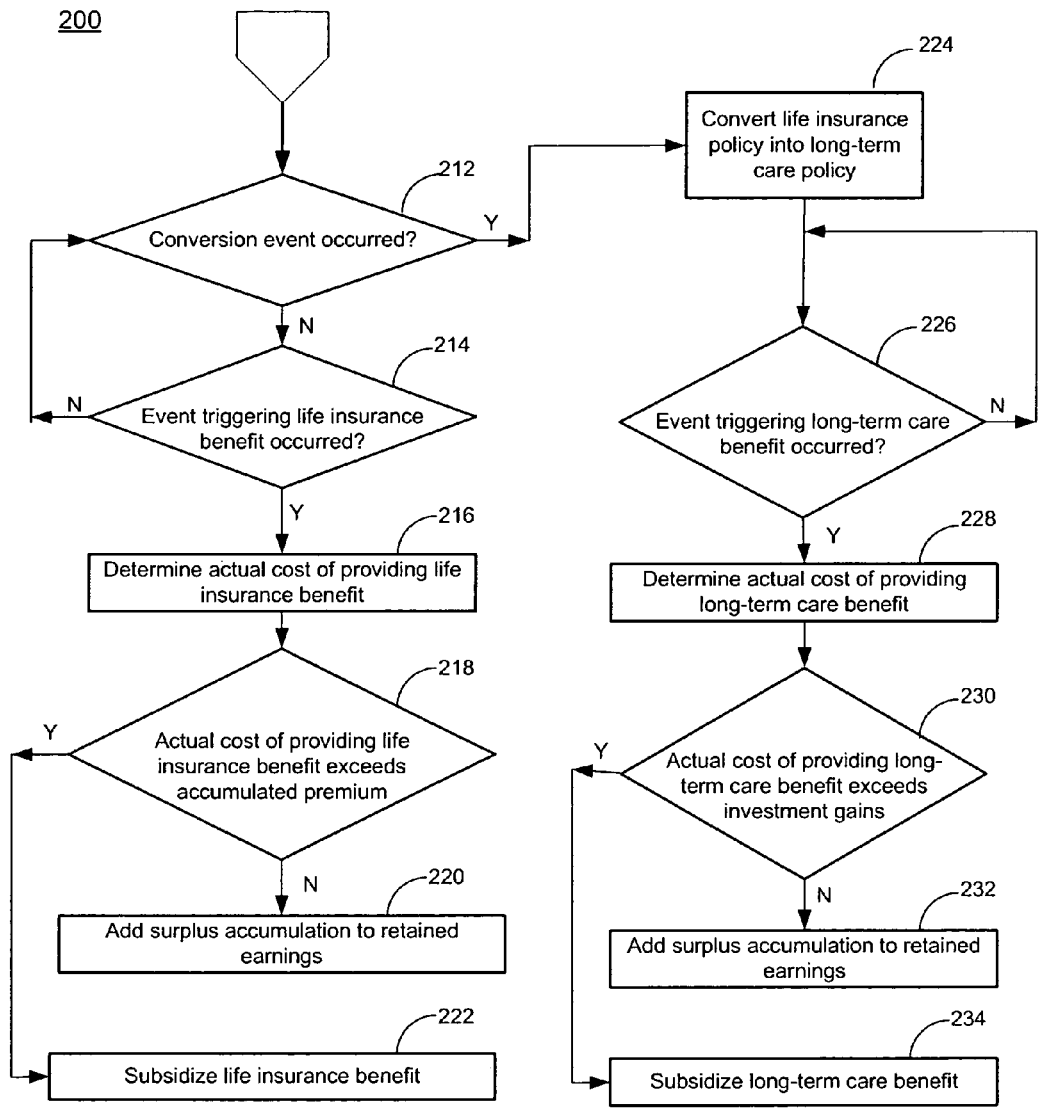

Referring to FIGS. 2 and 3, a process 200 of underwriting a life insurance benefit convertible into long-term care benefit will be described.

At 202, information determining a life insurance benefit, a long-term care benefit, benefits beneficiaries, conversion events, and benefit triggering events is received by the underwriter of the life insurance benefit and the long-term benefit. For example, the underwriter of the benefits may be an insurance company. The type and content of the information received at 202 generally corresponds to the information obtained at 102, which was described earlier.

At 204, the benefit provider, for example, an insurance company, estimates expected life insurance benefit and long-term care benefit. Benefits estimation at 204 is generally comparable to the benefit estimation at 102, which was described earlier.

At 206, the benefit provider computes a premium required to provide the estimated benefits. An exemplary formula suitable for computing the premium is described earlier herein.

At 208, the provider receives at least a portion of the computed premium. The receiving of the computed premium at 208 is generally comparable to the receiving of the computed premium at 108, which was described earlier. At 210, the provider invests all or a portion of the received premium for accumulation. Various suitable investment vehicles may be used for investing the received premiums, as known to those of skill in the art.

At 212, the benefit provider checks whether a conversion event specified at 202 has occurred. If a conversion event has occurred at 212, the life insurance benefit converts into the long-term care benefit at 224. Upon the conversion, the life insurance benefit ceases to be available and the long-term care benefit becomes available. Upon conversion, in case of COLI, the benefit provider repays back to the corporate owner of the COLI, its cash surrender value to minimize any impact on the corporate owner's balance sheet. Any remaining cash value buildup, which in some embodiments will include any investment gains will be applied or allocated to provide the long term care benefit. If none of the conversion events has occurred at 212, the benefit provider checks whether an event triggering the life insurance benefit has occurred at 214.

If an event triggering the life insurance benefit occurs at 214, at 116 the provider determines the actual cost of providing the life insurance benefit to the insured or the designated beneficiary of the life-insurance benefit specified at 202. The actual cost of providing the life insurance benefit may depend on how the life insurance benefit is provided. For example, the life insurance benefit may be paid to the insured or the designated beneficiary as a lump sum payment or a series of periodic payments. Selection regarding the form and manner of payments may be made at 202 or at the time the payment is due.

At 218, the benefit provider checks whether the actual cost of providing the life insurance benefit exceeds the premium accumulated at 210. If the actual cost of providing the life insurance benefit exceeds the accumulated premium, it may result in a loss for the benefit provider, which may need to subsidize the cost of providing the life insurance benefit at 222. If the actual cost of providing the life insurance benefit is less than the accumulated premium, the benefit provider may add the surplus accumulation to retained earnings at 220 and use it, for example, to offset the cases in which the life insurance benefit due exceeded the accumulated premium. As those skilled in the art will appreciate, by creating a large pool of insureds, the benefit provider may be able to offset the instances in which the life insurance benefit exceeded the accumulated premium with the instances in which the actual cost of providing the life insurance benefit is less than the accumulated premium.

If a conversion event has occurred at 212 and the life insurance benefit has been converted into long-term benefit at 224, the benefit provider checks whether any event triggering the long-term care benefit has occurred at 226. If an event triggering the long-term care policy occurs at 226, the provider determines the actual cost of providing the long-term care benefit to the insured or the designated beneficiary of the long-term care benefit at 228. The actual cost of providing the long-term care benefit may depend on how the long-term care benefit is provided. The long-term care benefit may be provided in various ways and combination thereof. For example, the long-term care benefit may be paid directly to the insured or the designated beneficiary as a lump sum payment or a series of periodic payments. Alternatively, the benefit may be provided as a non-monetary benefit, for example, in a form of a stay at a specified nursing home for a specified period of time. Selection regarding the form and manner of providing the long-term care benefit may be made at 202 or at the time the benefit is due.

At 230, the benefit provider checks whether the actual cost of providing the long-term care benefit exceeds the accumulated cash value buildup, including any investment gains on the accumulated premiums. If the actual cost of providing the long-term care benefit exceeds the investment gains, it may result in a loss for the benefit provider, which may need to subsidize the cost of providing the long-term care benefit at 234.

If the actual cost of providing the long-term care benefit is less than the investment gains, the benefit provider may retain the surplus gains as its earning at 234 or use it, for example, to offset the cases in which the life insurance benefit due exceeded the accumulated premium. As those skilled in the art will appreciate, by creating a large pull of insured, the benefit provider may be able to offset the instances in which the cost of long-term care benefit due exceeded the investment gains with the instances in which the actual cost of providing the long-term care benefit is less than the investment gains. Alternatively, or in addition, the surplus, if any, can be used to provide yet another benefit to the insured or a designated beneficiary (not shown).

Figure 4:
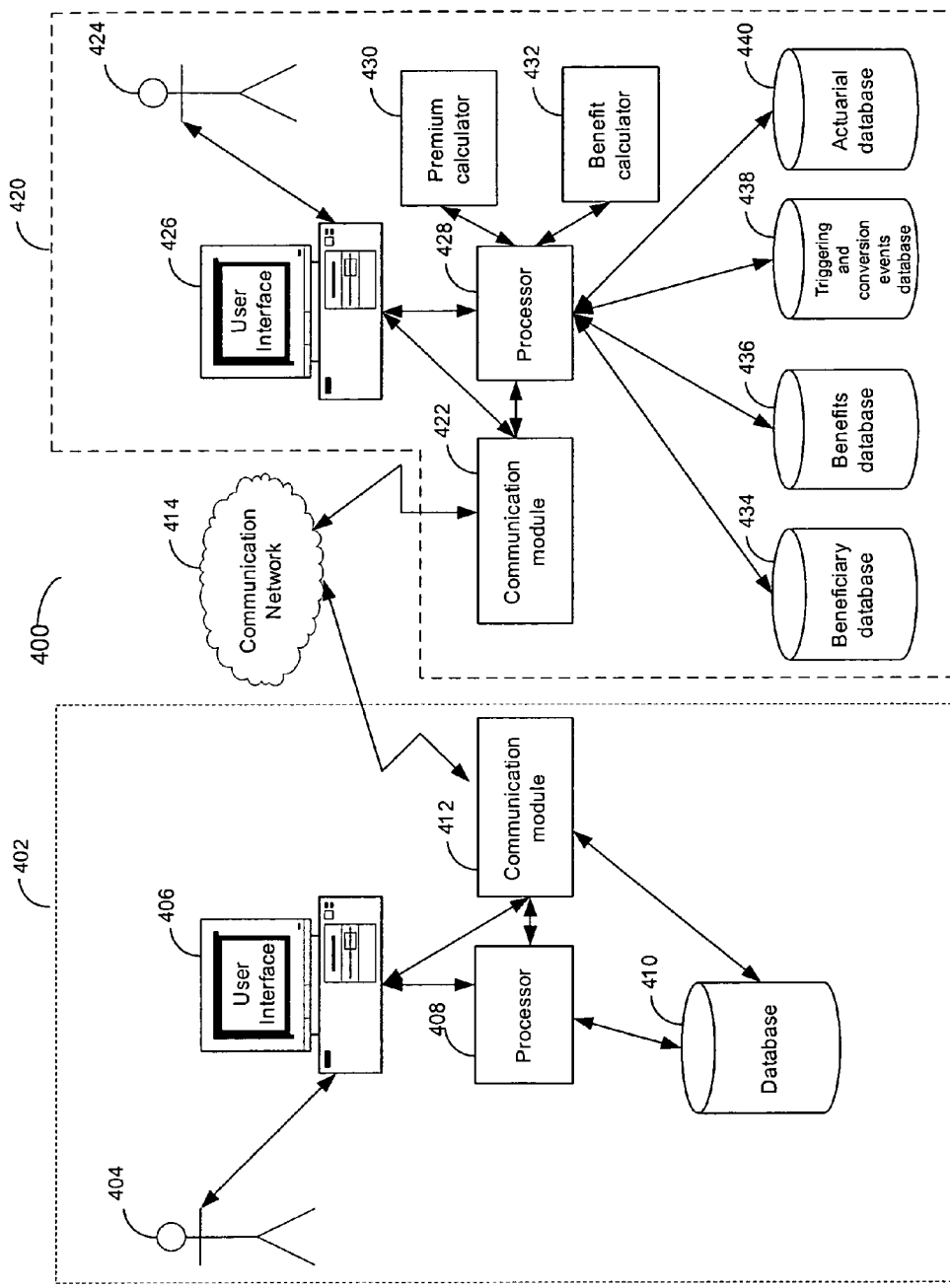
FIG. 4 is a system diagram illustrating a system for providing and underwriting a life insurance benefit convertible into long-term care benefit in accordance with one embodiment of the present invention.

Referring to FIG. 4, there is shown a system 400 for providing and underwriting a life insurance benefit convertible into long-term care benefit. System 400 may be suitable in implementing processes 100 and 200 described in detail herein.

System 400 includes a client 402 and a server 420. Client 402 includes a user interface 406 for obtaining information from a user 404 to determine a life insurance benefit, a long-term care benefit, benefits beneficiaries, conversion events, and benefits triggering events. User interface 406 is connected to a processor 408 and a commutation module 412. Processor 408 is connected to a database 410, which may also be connected to communication module 412. Database 410 may be used for storing the information regarding the insured, the benefits, benefits beneficiaries, conversion events, and benefits triggering events. Client 402 communicates with server 420 via communication network 414.

Server 420 may include a communication module 422 for communicating with client 402 and receiving the information determining the benefits, benefits beneficiaries, conversion events, and benefits triggering events. It may further include a user interface 426 to enable a benefit administrator 424 to administer the benefits in accordance with the processes described herein. Server 420 may also include a processor 428 connected to a premium calculator 430, a benefit calculator 432, a beneficiary database 434, a benefits database 436, a triggering and conversion events database 438, and an actuarial database 440.

Figure 5:
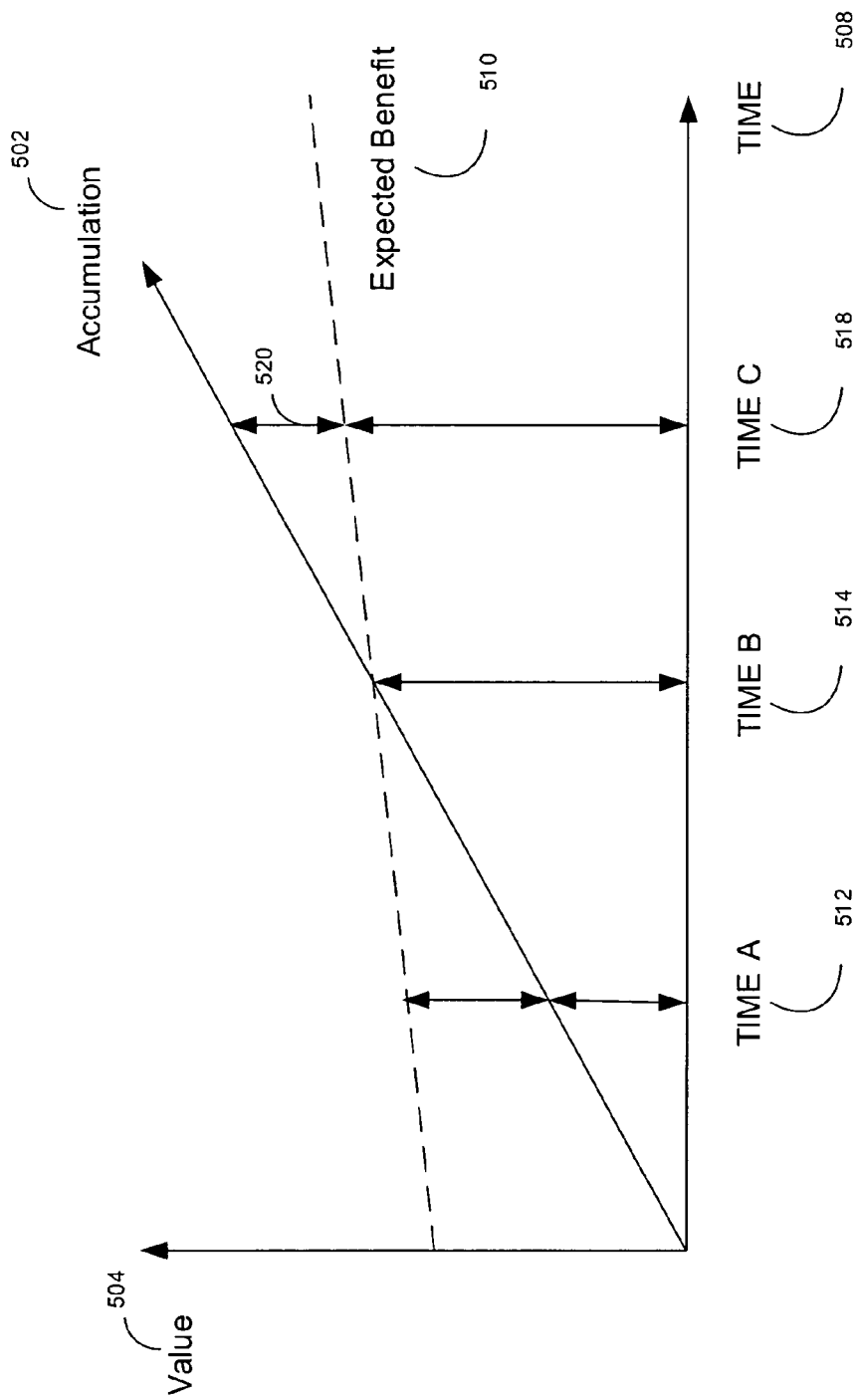
FIG. 5 illustrates the accumulation of value in an insurance policy over time in accordance with one embodiment of the present invention.

FIG. 5 illustrates the accumulation 502 of value 504 in an insurance policy, such as a whole life insurance policy, over time 508, according to an embodiment of the invention. FIG. 5 also shows the expected cost of the expected benefit 510 upon conversion of the policy, and changes in this expected benefit 510 over time. If the conversion event occurs at Time A 512, the accumulation of wealth 502 will be less than that required to pay the expected benefit 510 upon conversion. This may result in a loss for the party writing the insurance. If the event occurred at Time B 514, the expected benefit 510 could be completely covered by the wealth accumulated 502 in the policy. In this situation, the benefit would be completely funded. In the case of a corporate owned life insurance policy, the company would have recognized an asset from the time the policy was written until conversion at the event 504 at Time B 514. The effect of the combined insurance and long term benefit policy may be to fund a second benefit, such as a deferred executive compensation plan, the creation of an asset for the company, or avoidance of a deduction from earnings as a result of paying compensation. At Time B 514 the accumulation of premiums over time and any resulting gains may completely fund the long term care benefit 510.

Referring again to FIG. 5, if a conversion event occurred at Time C 518, there may be value in the policy in excess of that needed to fund the benefit upon conversion. In the case of corporate owned life insurance, this excess 520, possibly of the accumulation of premiums and gains over time over the amount of the long term care, may be retained as profit, or a portion thereof may be transferred to the company. Again, the effect of the combined insurance and long term care benefit policy may be deferred executive compensation, the creation of an asset for the company, or avoidance of a deduction from earnings as a result of paying compensation.

Figure 6:
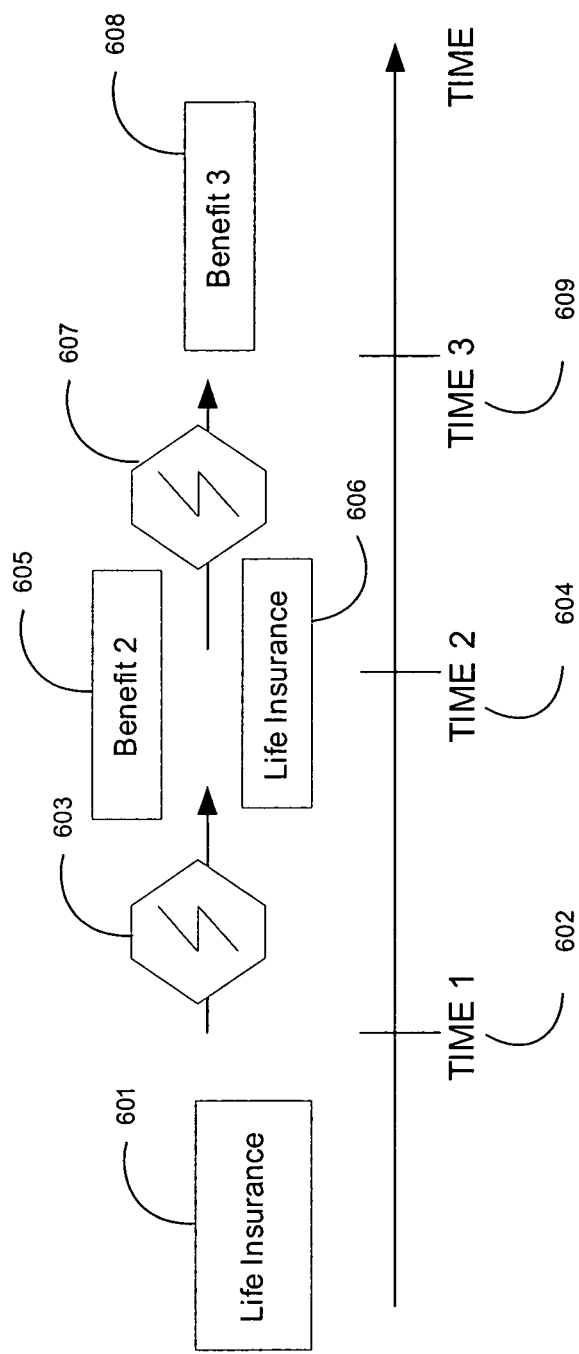
FIG. 6 illustrates a partial conversion of a convertible policy in accordance with one embodiment of the present invention.

FIG. 6 illustrates the case of a partial conversion, according to some embodiments of the invention, in which all or a portion of the remaining insurance 606 may be converted at a later time or upon the occurrence of a subsequent event 607. The insurance 601 may first be partially converted upon the occurrence of an event 603. The event 603 may be the departure of the employee from the company and a Benefit 2 605 may be the payment of a lump sum severance payment to that employee at Time 2 604. In some embodiments, Benefit 2 605 may also be a long term care benefit or other benefits. The remainder of the insurance policy 606 may also still exist at Time 2 604. The remainder may be due to the accumulation of wealth in the policy over the expected cost of the benefit as at Time C in FIG. 5. Upon the occurrence of a subsequent event 607, the remainder policy 606 may convert into yet another Benefit 3 608. The subsequent event 607 may be the hiring of a replacement employee for the position and the additional Benefit 3 608 may be a lump sum payment used to fund the signing bonus for the new employee at Time 3 609.

While the invention has been described and illustrated in connection with preferred embodiments, many variations and modifications as are to be evident to those of skill in the art may be made without departing from the spirit and scope of the invention, and the invention is thus not to be limited to the precise details of methodology or construction set forth above, as such variations and modifications are intended to be included within the scope of the invention. For example, in some embodiments, several benefits may convert into another benefit using the systems and methods disclosed herein. It is to be understood by those of ordinary skill in the art that the various data processing tasks described herein may be implemented in a wide variety of ways, many of which are known and many more of which are doubtless to be hereafter developed. For example, a wide variety of computer programs and languages are now known, and are likely to be developed, which are suitable for storing, accessing, and processing data, as well as for performing, processing, and using actuarial forecasts and other analyses as disclosed herein. Except to the extent necessary or inherent in the processes themselves, no particular order to steps or stages of methods or processes described in this disclosure, including the figures, is implied.

What is claimed is:

1. A computerized method for providing a corporate owned insurance policy with convertible benefits, the method comprising:
    electronically receiving information for determining a life insurance benefit and a long term care benefit to be provided to the employee, and at least one conversion event, wherein the life insurance benefit and the long term care benefit are provided by a single corporate owned insurance policy, and wherein the life insurance benefit is converted to the long term care benefit upon the occurrence of the at least one conversion event, the at least one conversion event including one of retirement of the employee, the employee reaching a given age, fulfilling a given length of service, and disability of the employee;
    electronically computing, using a processing device, a premium for the single corporate owned insurance policy, the premium computed such that the single corporate owned insurance policy provides the life insurance benefit before the occurrence of the at least one conversion event and the long term care benefit after the occurrence of the at least one conversion event, wherein the premium is computed as a function of Ax and $ä'_{x:n}$ where $$A_x = \Sigma_{s=0}^{\infty}(v_s) \times (_sP_x) \times (q'_{x+s+1/12}), \text{ and}$$

$$ä'_{x:n} = 1 + \Sigma_{s=1}^{n-1}(v_s) \times (_sP'_x), \text{ and where}$$

s=range of months,
   x=issue age of the employee,
   n=number of complete months since an issue date,
   $v_s$=present value of a dollar paid in month s based on a discount rate,
   $q'_x$=annual mortality rate for a person age x, which may be the guaranteed cost of insurance, and
   $_sP'_x$=probability that a person age x survives s months; and
   electronically issuing the single corporate owned insurance policy based on the computed premium.

2. The method of claim 1, comprising receiving information for determining a disability benefit and a long term care benefit provided by the single corporate owned insurance policy.

3. The method of claim 1, wherein the life insurance benefit and the long term care benefit are provided by the employee's employer.

4. The method of claim 3, comprising the employer arranging for a third party provider to provide the life insurance benefit and the long term care benefit.

5. The method of claim 4, wherein the third party provider is an insurance company.

6. The method of claim 1, wherein receiving information comprises specifying at least one event triggering the life insurance benefit and at least one event triggering the long term care benefit.

7. The method of claim 6, wherein issuing the single corporate owned insurance policy comprises issuing the corporate owned insurance policy to provide the life insurance benefit upon the occurrence of the specified event triggering the life insurance benefit and to provide the long term care benefit upon the occurrence of the specified event triggering the long term care benefit.

8. The method of claim 1, wherein receiving information for determining the life insurance and long term care benefits comprises receiving at least one designated beneficiary of the life insurance benefit and at least one designated beneficiary of the long term care benefit.

9. The method of claim 8, wherein the designated beneficiary of the life insurance benefit is the same as the designated beneficiary of the long term care benefit.

10. The method of claim 8, wherein the designated beneficiary of the life insurance benefit is different than the designated beneficiary of the long term care benefit.

11. The method of claim 10, wherein the designated beneficiary of the life insurance benefit is an employer and the designated beneficiary of the long term care benefit is an employee.

12. The method of claim 1, wherein receiving the information for determining the life insurance benefit comprises receiving at least one specified acceleration event accelerating the life insurance benefit.

13. The method of claim 1, wherein computing the premium comprises: computing a first premium to fund the life insurance benefit;
computing a second premium to fund the long term benefit;
computing the premium based at least in part on the first and second premiums.

14. The method of claim 1, comprising identifying an expected date of the at least one conversion event and computing an expected remaining value of the life insurance benefit at the expected conversion event date.

15. The method of claim 14, wherein computing the premium comprises computing the premium to allow for the expected remaining value of the life insurance benefit at the expected conversion date to be sufficient to cover fund the long term care benefit.

16. A system for offering a corporate owned insurance policy with convertible benefits, the system comprising:
a user interface effective to receive information specifying a life insurance benefit and a long term care benefit to be provided to an employee, and at least one conversion event, wherein the life insurance benefit and the long term care benefit are both provided by a single corporate owned insurance policy, and wherein the life insurance benefit is converted to the long term care benefit upon the occurrence of the at least one conversion event;
a database connected to the user interface and effective to store the received information; and
a processor connected to the user interface and database, the processor effective to process the received information and to compute a premium for the single corporate owned insurance policy, the premium computed such that the single corporate owned insurance policy provides the life insurance benefit upon the occurrence of at least one specified conversion event triggering the life insurance benefit and the long term care benefit after the occurrence of the specified conversion event and upon the occurrence of the at least one specified event triggering the long term care benefit, the at least one specified conversion event including one of retirement of the employee, the employee reaching a given age, fulfilling a given length of service, and disability of the employee, wherein the premium is computed as a function of Ax and $ä'_{x:n}$ where $$A_x = \Sigma_{s=0}^{\infty}(v_s) \times (_sP_x) \times (q'_{x+s+1/12}), \text{ and}$$

$$ä'_{x:n} = 1 + \Sigma_{s=1}^{n-1}(v_s) \times (_sP'_x), \text{ and where}$$

s=range of months,
x=issue age of the employee,
n=number of complete months since an issue date,
$v_s$=present value of a dollar paid in month s based on a discount rate,
$q'_x$=annual mortality rate for a person age x, which may be the guaranteed cost of insurance, and
$_sP'_x$=probability that a person age x survives s months.

17. A system for underwriting a convertible benefit, the system comprising:
a user interface effective to receive information specifying a life insurance benefit provided to an employee, at least one event triggering the life insurance benefit, a long term care benefit provided to the employee, at least one event triggering the long term care benefit, at least one conversion event, wherein the life insurance benefit and the long term care benefit are both provided by a single corporate owned insurance policy, and wherein the life insurance benefit is converted to the long term care benefit upon the occurrence of the at least one conversion event, the at least one conversion event including one of retirement of the employee, the employee reaching a given age, fulfilling a given length of service, and disability of the employee;
an actuarial data database connected to the user interface and effective to store the received information and actuarial data;
a processor connected to the user interface and actuarial data database, the processor effective to process the received information and actuarial data and to compute at least a portion of a premium required to provide the long term care benefit, wherein the long term care benefit is provided after the occurrence of the at least one conversion event, wherein the premium is computed as a function of Ax and $ä'_{x:n}$ where $$A_x = \Sigma_{s=0}^{\infty}(v_s) \times (_sP_x) \times (q'_{x+s+1/12}), \text{ and}$$

$$ä'_{x:n} = 1 + \Sigma_{s=1}^{n-1}(v_s) \times (_sP'_x), \text{ and where}$$

s=range of months,
x=issue age of the employee,
n=number of complete months since an issue date,
$v_s$=present value of a dollar paid in month s based on a discount rate,
$q'_x$=annual mortality rate for a person age x, which may be the guaranteed cost of insurance, and
$_sP'_x$=probability that a person age x survives s months.

18. A computerized method for providing a single corporate owned life insurance policy with convertible benefits, the method comprising:
electronically determining a life insurance benefit, a long term care benefit, and at least one conversion event related to an employee, wherein the life insurance benefit and the long term care benefit are both provided under a single corporate owned insurance policy, and wherein the life insurance benefit is converted to the long term care benefit upon the occurrence of the at least one conversion event, the at least one conversion event including one of retirement of the employee, the employee reaching a given age, fulfilling a given length of service, and disability of the employee;
electronically computing, using a processing device, a premium for the single corporate owned insurance policy, the premium computed such that the single corporate owned insurance policy provides the life insurance benefit before the occurrence of the at least one conversion event and the long term care benefit after the occurrence of the at least one conversion event, wherein the premium is computed as a function of Ax and $ä'_{x:n}$ where $A_x = \Sigma_{s=0}^{\infty}(v_s) \times (_sP_x) \times (q'_{x+s+1/12})$, and $ä'_{x:n} = 1 + \Sigma_{s=1}^{n-1}(v_s) \times (_sP'_x)$, and where s=range of months,
x=issue age of the employee,
n=number of complete months since an issue date,
$v_s$=present value of a dollar paid in month s based on a discount rate,
$q'_x$=annual mortality rate for a person age x, which may be the guaranteed cost of insurance, and
$_sP'_x$=probability that a person age x survives s months; and
issuing the single corporate owned insurance policy based on the computed premium.

19. A computerized method for providing a single convertible corporate owned life insurance policy, the method comprising:
electronically determining a life insurance benefit, a long term care benefit, and at least one conversion event, the at least one conversion event including one of retirement of the employee, the employee reaching a given age, fulfilling a given length of service, and disability of the employee;
electronically computing, using a processing device, a premium required to provide the life insurance benefit before the occurrence of the at least one conversion event and the long term care benefit after the occurrence of the at least one conversion event, wherein the life insurance benefit and the long term care benefit are both provided under the single convertible corporate owned insurance policy, and wherein the life insurance benefit is converted to the long term care benefit upon the occurrence of the at least one conversion event, wherein the premium is computed as a function of Ax and $ä'_{x:n}$ where $A_x = \Sigma_{s=0}^{\infty}(v_s) \times (_sP_x) \times (q'_{x+s+1/12})$, and $ä'_{x:n} = 1 + \Sigma_{s=1}^{n-1}(v_s) \times (_sP'_x)$, and where s=range of months,
x=issue age of the employee,
n=number of complete months since an issue date,
$v_s$=present value of a dollar paid in month s based on a discount rate,
$q'_x$=annual mortality rate for a person age x, which may be the guaranteed cost of insurance, and
$_sP'_x$=probability that a person age x survives s months;
and issuing the single convertible corporate owned life insurance policy based on the computed premium.

20. A computerized method for providing a partially convertible life insurance policy, the method comprising:
receiving information for determining a life insurance benefit and a long term care benefit to be provided to an employee, and a first conversion event, wherein the life insurance benefit and the long term care benefit are both provided by a partially convertible life insurance policy, and wherein the life insurance benefit is converted to the long term care benefit upon the occurrence of the first conversion event, the first conversion event including one of one of a retirement of the employee, the employee reaching a given age, fulfilling a given length of service, and disability of the employee;
computing a premium for the partially convertible life insurance policy which provides before the first conversion event, the life insurance benefit, and after the first conversion event, at least a portion of the life insurance benefit and the long term care benefit, wherein the premium is computed as a function of Ax and $ä'_{x:n}$ where $A_x = \Sigma_{s=0}^{\infty}(v_s) \times (_sP_x) \times (q'_{x+s+1/12})$, and $ä'_{x:n} = 1 + \Sigma_{s=1}^{n-1}(v_s) \times (_sP'_x)$, and where s=range of months,
x=issue age of the employee,
n=number of complete months since an issue date,
$v_s$=present value of a dollar paid in month s based on a discount rate,
$q'_x$=annual mortality rate for a person age x, which may be the guaranteed cost of insurance, and
$_sP'_x$=probability that a person age x survives s months; and
issuing the partially convertible life insurance policy based on the computed premium.

21. The method of claim 20 further comprising:
receiving information for determining a third benefit to be provided under the partially convertible life insurance policy different than the life insurance benefit and the long term care benefit, and a second conversion event;
computing a premium for an insurance policy that provides at least the third benefit after the second conversion event, wherein the premium is computed as a function of Ax and $ä'_{x:n}$ where $A_x = \Sigma_{s=0}^{\infty}(v_s) \times (_sP_x) \times (q'_{x+s+1/12})$, and $ä'_{x:n} = 1 + \Sigma_{s=1}^{n-1}(v_s) \times (_sP'_x)$, and where s=range of months,
x=issue age of the employee,
n=number of complete months since an issue date,
$v_s$=present value of a dollar paid in month s based on a discount rate,
$q'_x$=annual mortality rate for a person age x, which may be the guaranteed cost of insurance, and
$_sP'_x$=probability that a person age x survives s months; and
issuing the insurance policy based on the computed premium.

22. A computerized method for providing a partially convertible life insurance policy, the method comprising:
electronically determining a life insurance benefit, a long term care benefit, and at least one conversion event, wherein the life insurance benefit and the long term care benefit are both provided to an employee under the partially convertible life insurance policy, and wherein the life insurance benefit is converted to the long term care benefit upon the occurrence of the at least one conversion event, the at least one conversion event including one of retirement of the employee, the employee reaching a given age, fulfilling a given length of service, and disability of the employee;
electronically computing, using a processing device, a premium required to provide before the occurrence of the at least one conversion event, the life insurance benefit, and after the occurrence of the at least one conversion event, at least a portion of the life insurance benefit and the long term care benefit, wherein the premium is computed as a function of Ax and $ä'_{x:n}$ where $A_x = \Sigma_{s=0}^{\infty}(v_s) \times (_sP_x) \times (q'_{x+s+1/12})$, and $ä'_{x:n} = 1 + \Sigma_{s=1}^{n-1}(v_s) \times (_sP'_x)$, and where s=range of months,
x=issue age of the employee,
n=number of complete months since an issue date, $v_s$=present value of a dollar paid in month s based on a discount rate, $q'_x$=annual mortality rate for a person age x, which may be the guaranteed cost of insurance, and $_sP'_x$=probability that a person age x survives s months; and issuing the partially convertible life insurance policy based on the computed premium.

23. A computerized method for providing a corporate owned life insurance policy with partially convertible benefits, the method comprising:

electronically determining a life insurance benefit and a long term care benefit to be provided to the employee, and at least one conversion event related to the employee, wherein the life insurance benefit and the long term care benefit are both provided under a single corporate owned insurance policy, and wherein the life insurance benefit is converted to the long term care benefit upon the occurrence of the at least one conversion event, the at least one conversion event including one of retirement of the employee, the employee reaching a given age, fulfilling a given length of service, and disability of the employee;

electronically computing, using a processing device, a premium for the single corporate owned insurance policy, the premium computed such that the insurance policy provides before the occurrence of the at least one conversion event, the life insurance benefit, and after the occurrence of the at least one conversion event, at least a portion of the life insurance benefit and the long term care benefit, wherein the premium is computed as a function of Ax and $ä'_{x:n}$ where $A_x = \Sigma_{s=0}^{\infty}(v_s) \times (_sP_x) \times (q'_{x+s+1/12})$, and $ä'_{x:n} = 1 + \Sigma_{s=1}^{n-1}(v_s) \times (_sP'_x)$, and where s=range of months, x=issue age of the employee, n=number of complete months since an issue date, $v_s$=present value of a dollar paid in month s based on a discount rate, $q'_x$=annual mortality rate for a person age x, which may be the guaranteed cost of insurance, and $_sP'_x$=probability that a person age x survives s months; and issuing the corporate owned life insurance policy based on the computed premium.

24. The method of claim 1, wherein electronically computing, using the processing device, the premium comprises calculating:

$A_x/ä'_{x:84}$, for $s=1$ to 84 (Premium$_s$=0 for $s>84$).

25. The method of claim 1 further comprising calculating:

a long term care benefit=$b$ %×face amount of life insurance benefit; and $$\text{daily long term care benefit payment} = \frac{1}{365 \times Y} \times \text{long term care benefit;}$$

where,

Y=number of years the long term care benefit is paid out; and b %=a percentage of face value of the life insurance benefit to be applied to the long term care benefit.

\* \* \* \* \*